April 24, 1951   W. L. BROWN   2,550,038
CLOSING ATTACHMENT FOR LINKS
Filed May 5, 1950
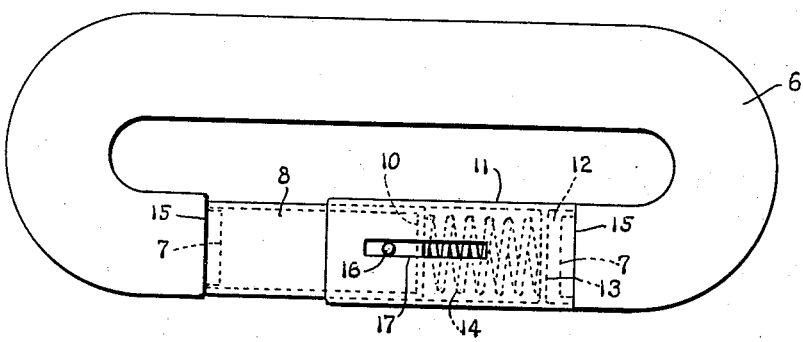
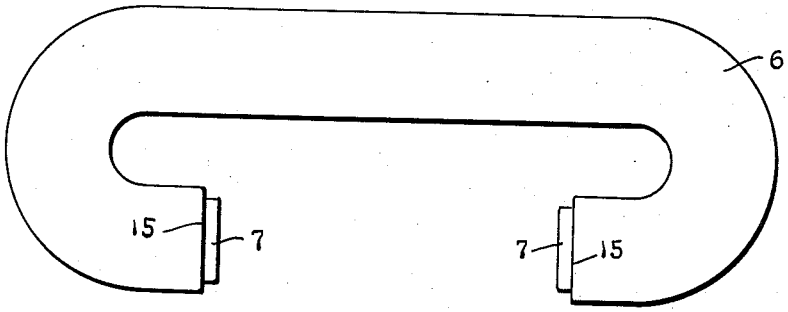
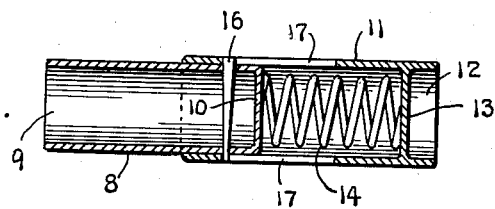
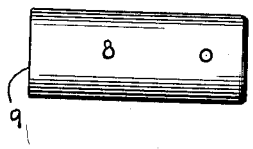
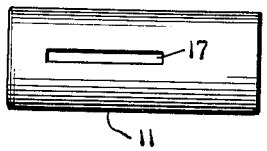
INVENTOR:
WILLIAM L. BROWN
By Albert J. McCauley
ATTORNEY.

Patented Apr. 24, 1951

2,550,038

UNITED STATES PATENT OFFICE 2,550,038

CLOSING ATTACHMENT FOR LINKS

William L. Brown, Carmi, Ill.

Application May 5, 1950, Serial No. 160,293

3 Claims. (Cl. 59—85)

This invention relates to closing attachments for links adapted for use in making connections at places where it is necessary to fasten a wire line, rope, chain, eye bolt, turnbuckle or traveling block, etc., to another wire line, rope, etc., or directly to a weight or load to be supported by the link. Certain advantages appear in attaching the new link device to heavy or cumbersome loads requiring both hands for the operation of locating an article inside of the link.

One of the objects of the invention is to produce a simple closing device entirely removable from the link, so as to leave both hands free to manipulate the open link, which overcomes the problem involved in making many of the link connections. Another object is to accomplish this result in an extremely simple manner, without requiring the use of tools, bolts or nuts for operation of the completely detachable closing device.

More specifically stated, an object of the invention is to produce a safe and dependable link of this kind wherein the entirely detachable closing device comprises a pair of simple members telescoped with each other, and provided with open outer ends adapted to securely interlock with separated end portions of the link, a spring being employed to forcibly interlock both of the telescoping members with the link. However, this spring can be readily compressed to completely detach the entire closing device, which may be laid aside to leave both hands free for the work of connecting an object to the open link. At this time, the spring is securely confined within the idle closing device.

A further object is to provide for deliberate removal of the spring, preferably by using a simple means for detachably connecting the telescoping members which normally confine the spring. When this detachable connection is removed, all of the other elements of the closing device automatically separate from each other, thus enabling the spring or any other part to be conveniently replaced. This is quite important around oil wells where links of this type are most commonly used. The corrosive action of salt water and sour gas makes it necessary to replace various parts, especially the spring. I will hereinafter refer to a specific connecting member arranged to limit longitudinal movement of the telescoping members, but adapted to be very easily removed to separate said telescoping members from the spring.

A still further object is to accomplish all of these desirable results by means of a simple unitary closing device adapted to be very easily and quickly applied to or removed from conventional types of open links; requiring no tools for its operation, and having no projecting obstruction to strike or catch on any thing else, thereby providing a desirable safety condition in the usual work of moving the closed link and its load in the vicinity of stationary structures or other objects near the field of movement.

With the foregoing and other objects in view, the invention comprises the very specific combination and arrangement of cooperative details herein shown to illustrate a completely detachable closing device having all of the aforesaid advantages. However, it is to be understood that the invention extends to minor variations within the scope of the claims hereunto appended.

In the accompanying drawings:

Fig. 1 is a side view of a link equipped with my new closing device.

Fig. 2 is a detail view of the body portion of the link.

Fig. 3 is a longitudinal section through the closing device as it appears when completely detached from the link.

Figures 4 and 5, respectively, are detail views of the plunger and sleeve members of the closing device.

I have shown a link member 6 in the form of a C having reduced end portions 7 separated from each other to receive the closing attachment. However, open links of any other shape may be employed.

The closing device comprises a plunger 8 having an open outer end 9 to receive and detachably interlock with one of the reduced end portions 7, the inner end of said plunger being closed, as shown most clearly at 10 in Figures 1 and 3. A sleeve 11 is telescoped with the closed inner end portion of the plunger 8, said sleeve having an open pocket 12 at its outer end to receive and detachably interlock with the other reduced end portion 7 of the link. The sleeve 11 is provided with an internal spring seat 13 near its open outer end.

A spring 14 is located entirely within the sleeve 11 where it is confined under pressure between the closed inner end 10 of the plunger and the spring seat 13 to force the sleeve and plunger away from each other, thereby forcibly interlocking the outer ends of the telescoping device with the reduced end portions 7 of the link, as shown in Fig. 1. This link has a pair of abutments 15 facing each other and engaged by the sleeve and plunger, so as to positively limit outward displacement of the forcibly interlocked outer ends of said sleeve and plunger.

In this manner, the closing attachment is securely interlocked with the link member 6, where it is confined under pressure between the oppositely disposed abutments 15. However, this closing device can be very easily and quickly detached by merely sliding one of the telescoping members along the other to reduce the length of the device, and then removing it from the link.

A very desirable cooperative detail appears in a specific means for limiting longitudinal movements of the telescoping sleeve and plunger, so as to confine the spring in the sleeve and maintain the desired telescopic relationship when the entire closing device is detached from the link. This detail preferably comprises a tapered pin 16 driven through diametrically opposite holes in the plunger 8 as shown in Fig. 3, one of said holes being smaller than the other, so that the tapered pin can be firmly anchored in the plunger. The sleeve 11 is provided with diametrically opposite longitudinal slots 17 to receive extended end portions of the tapered pin 16. These extended end portions preferably lie entirely within the slots 17 where they do not form objectionable projections along the smooth outer faces of the telescoping closing device.

As previously indicated, the spring 14 is normally confined within the detachable closing device, as shown in Fig. 3, but it is occasionally necessary to separate the plunger from the sleeve and remove the spring for the purpose of making replacements. Therefore, a further advantage appears in the fact that the tapered pin can be easily removed to disconnect the telescoping elements and provide for convenient replacement of the spring or other parts. Thereafter, the simple tapered pin is restored to unite the elements of the repaired closing device. This tapered pin 16 performs the function of a connecting device for the several members of the telescoping closing attachment, while serving as a stop for limiting the longitudinal telescopic movements, and at the same time providing for convenient separation and replacement of the unitary details.

It will now be understood that the specific combination and arrangement of cooperative details herein disclosed produces a new link device having real advantages, not only in the practical use of the entirely detachable closing device, but also in assembling and disconnecting the elements of this device.

I claim:

1. In a detachable link, a link member having end portions separated from each other, and a closing device comprising a plunger having an open outer end to receive and detachably interlock with one of said end portions, a spring seat carried by said plunger, a sleeve telescoped with said plunger, said sleeve having an open outer end to receive and detachably interlock with the other end portion of said link member, a spring seat inside of said sleeve, and a spring confined between the spring seats of said sleeve and plunger to force the sleeve and plunger away from each other, thereby forcibly interlocking the open outer ends of the telescoping sleeve and plunger with the separated end portions of the link member, said link member having a pair of abutments facing each other and engaged by the sleeve and plunger, so as to positively limit outward displacement of the forcibly interlocked outer ends of said sleeve and plunger, said sleeve and plunger being movable toward each other and away from said abutments to detach the entire closing device from the link member.

2. In a detachable link, a link member having end portions separated from each other, a plunger having an open outer end to receive and detachably interlock with one of said end portions, a spring seat carried by said plunger, a sleeve telescoped with said plunger, said sleeve having an open outer end to receive and detachably interlock with the other end portion of said link member, a spring seat inside of said sleeve, a spring confined between said spring seats of the sleeve and plunger to force said sleeve and plunger away from each other, thereby forcibly interlocking the open outer ends of the telescoping sleeve and plunger with the end portions of the link member, said link member having a pair of abutments facing each other and engaged by the sleeve and plunger, so as to positively limit outward displacement of the forcibly interlocked outer ends of said sleeve and plunger, said sleeve being provided with diametrically opposite longitudinal slots, and a tapered pin loosely connecting said sleeve and plunger to limit longitudinal movements of the telescoping sleeve and plunger, said sleeve and plunger being movable toward each other and away from said abutments to detach the entire closing device from the link, and said tapered pin being removable to separate the sleeve and plunger from the confined spring.

3. In a detachable link, a link member having reduced end portions separated from each other, a plunger having an open outer end to receive and detachably interlock with one of said reduced end portions, the inner end of said plunger being closed, a sleeve telescoped with the closed inner end portion of said plunger, said sleeve having a pocket in its outer end to receive and detachably interlock with the other reduced end portion of said link member, a spring seat inside of said sleeve, a spring located within said sleeve, said spring being confined between said spring seat and the closed inner end of the plunger to force the sleeve and plunger away from each other, thereby forcibly interlocking the outer ends of the telescoping sleeve and plunger with the reduced end portions of the link member, said link member having a pair of abutments facing each other and engaged by the sleeve and plunger, so as to positively limit outward displacement of the forcibly interlocked outer ends of said sleeve and plunger, said sleeve being provided with diametrically opposite longitudinal slots, and a tapered pin driven through said plunger, said tapered pin having extended end portions located within said longitudinal slots to limit longitudinal movements of the telescoping sleeve and plunger, said sleeve and plunger being movable toward each other and away from said abutments to detach the entire closing device from the link member, and said tapered pin being removable to separate the sleeve and plunger from the confined spring.

WILLIAM L. BROWN.

No references cited.